United States Patent Office 2,943,516
Patented July 5, 1960

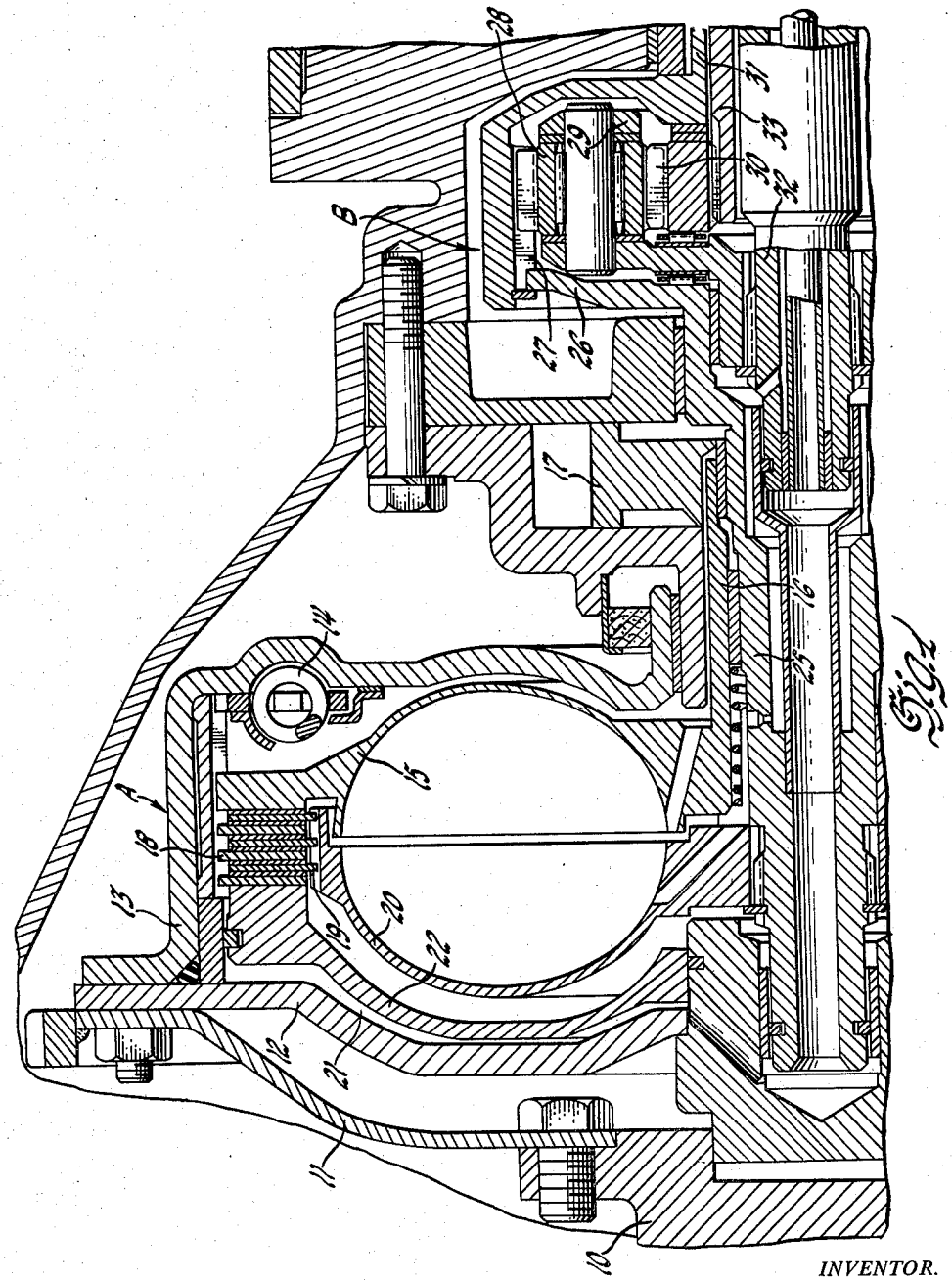

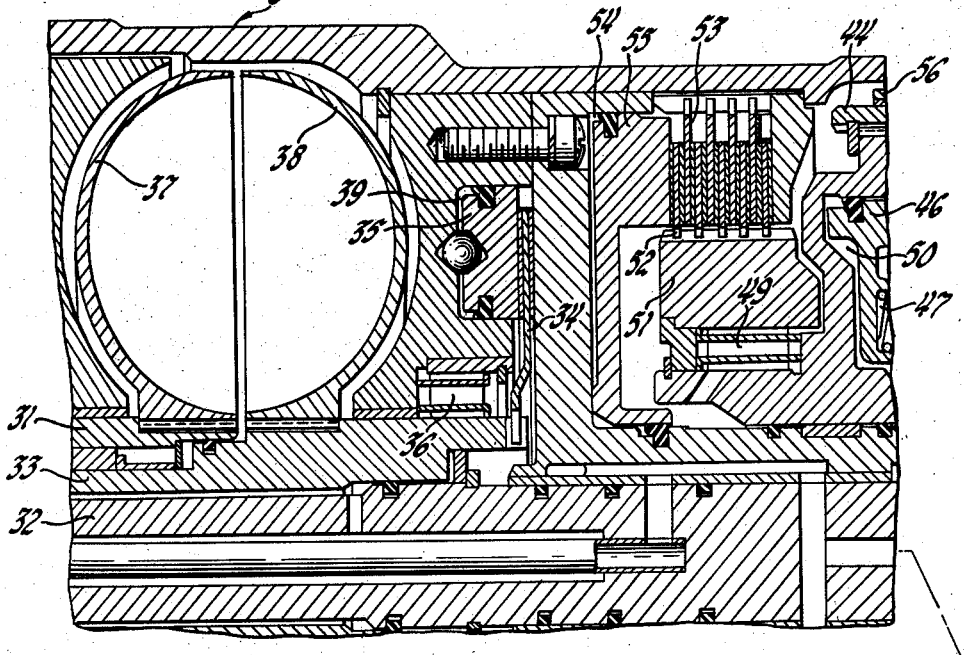
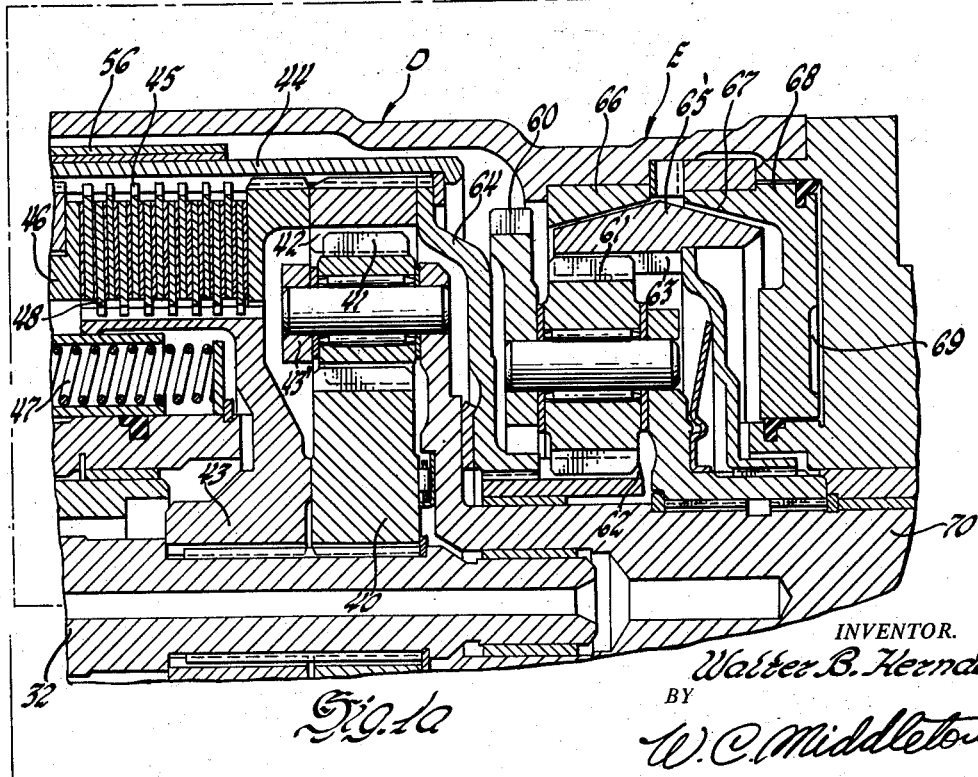
INVENTOR.
Walter B. Herndon
BY
W. C. Middleton
ATTORNEY

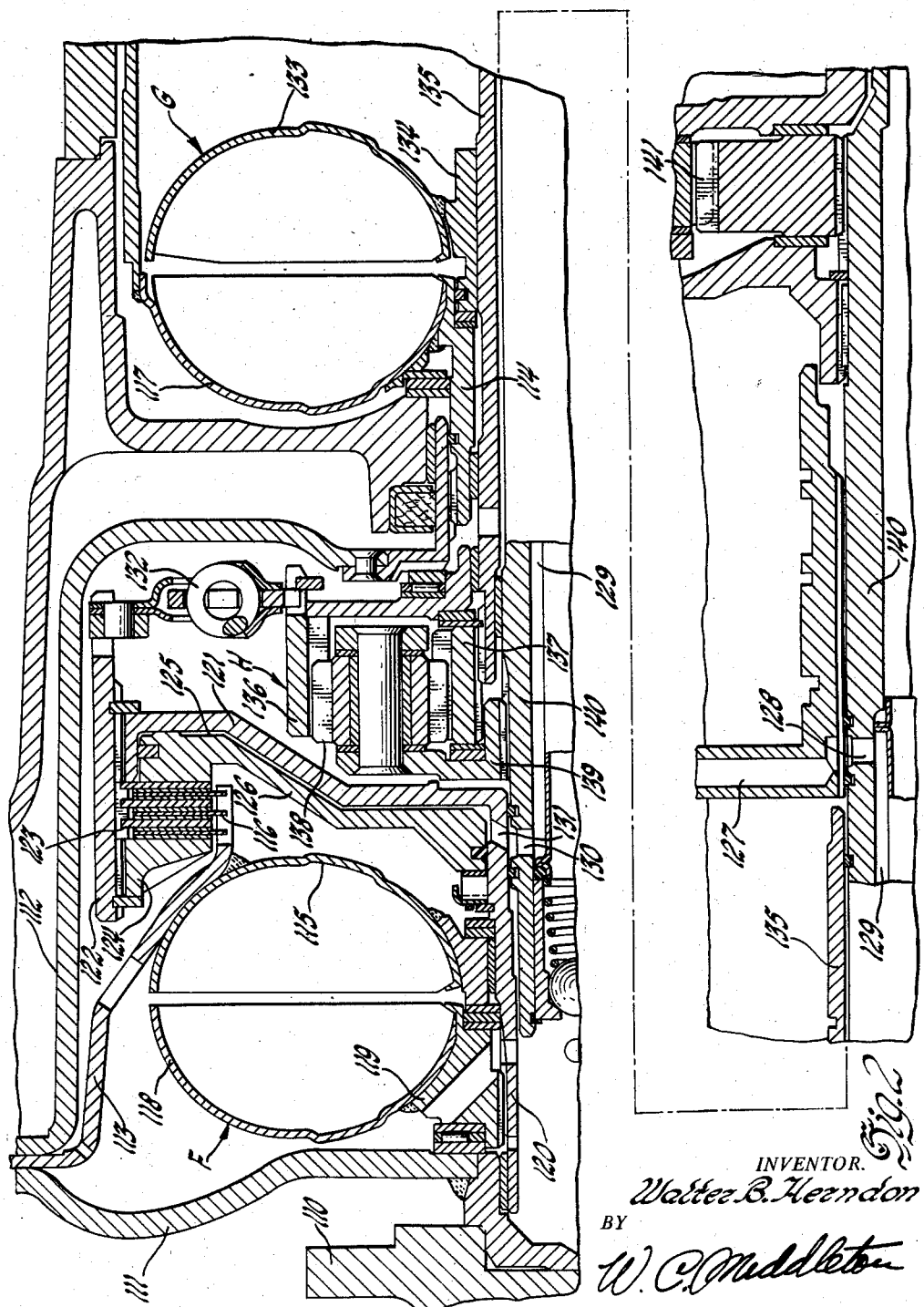

2,943,516

TRANSMISSION

Walter B. Herndon, Ann Arbor, Mich., assignor to General Motors Corporation, Detroit, Mich., a corporation of Delaware Filed July 5, 1957, Ser. No. 670,090

4 Claims. (Cl. 74—732)

This invention relates to transmissions and particularly to transmissions for automotive vehicles. The transmission is designed to utilize minimum space for a given capacity in order to provide maximum floor clearance when installed in a vehicle.

An object of this invention is to provide a transmission constructed and arranged to require minimum floor clearance when installed in an automotive vehicle.

An additional object of this invention is to provide a transmission incorporating hydrodynamic torque transfer devices in conjunction with planetary gearing units and adapted to provide smooth shift of ratio from one drive ratio to another.

Another object of this invention is to provide a transmission incorporating a pair of hydrodynamic torque transfer devices operable in conjunction with planetary gearing units to provide different drive ratios wherein one of the hydrodynamic torque transfer devices is designed to provide for considerable slip whenever it acts as a hydrodynamic torque transfer device and is provided with a clutch operable to assume full torque transfer in mechanical drive.

A further object of this invention is to provide a four speed ratio transmission of the step ratio type providing for smooth shift of drive ratio and also adapted to provide for maximum engine and churn braking.

These and other objects of this invention will be apparent from the following description and claims taken in conjunction with the accompanying drawings in which:

Figure 1 is a sectional view of the front portion of the transmission including a first fluid coupling device and first gear unit.

Figure 1A is a sectional view of the intermediate portion of the transmission including a second fluid coupling device and of the rear portion of the transmission including a second gear unit and a reverse gear unit.

Figure 2 is a sectional view of a modified arrangement of the fluid coupling devices wherein the impellers of each device are directly connected to the engine drum shaft for rotation at engine shaft speed.

Referring to the drawings there is shown an engine driven shaft 10 connected by a drive plate 11 to a flywheel 12 and a torus cover 13 of a hydrodynamic torque transfer device generally designated by the letter A. An impeller 15 is connected for rotation with torus cover 13 by means of a vibration dampener 14. A pump 17 is driven by a sleeve extension 16 of impeller 15. A turbine 20 carries clutch plates 19 adapted to engage clutch plates 18 carried by impeller 15 upon admission of fluid under pressure to a chamber 21 adjacent a clutch actuator piston 22. In this manner turbine 20 may be locked to impeller 15 for direct mechanical drive rather than fluid drive. The direct drive clutch provides for full engine torque capacity and efficient torque transfer with minimum losses.

Turbine 20 is splined to a shaft 25 having a drive flange 26 splined to a ring gear 27 of a planetary gearing unit generally designated by the letter B. Gear unit B comprises a plurality of planet gears 28 supported upon a planet carrier 29 and in mesh with ring gear 27 and a sun gear 30. A drive flange 31 fixed for rotation with ring gear 27 has an impeller 37 of a hydrodynamic torque transfer device generally designated at C splined thereto for rotation therewith. Thus, turbine 20, ring gear 27 and impeller 37 rotate as a unit. Planet carrier 29 is splined to a shaft 32 which also has a sun gear 40 and a clutch hub 43 of a planetary gearing unit designated by the letter D splined thereto for rotation therewith. Sun gear 30 is connected for rotation as a unit with a turbine 38 of coupling unit C by means of a sleeve shaft 33. A brake member 34 fixed to shaft 33 may be actuated by a piston 35 to prevent either forward or reverse rotation of sun gear 30 and turbine 38 upon admission of fluid under pressure to a chamber 39 adjacent piston 35. A one-way brake 36 is effective to prevent reverse rotation of sun gear 30 and turbine 38 upon application of power to ring gear 27 and to permit forward rotation of sun gear 30 and turbine 38. Coupling C is adapted to be alternately filled with working fluid and emptied of working fluid as desired.

Gear unit D includes a planet carrier 43' fixed to a power output shaft 70 and supporting a plurality of planet gears 41 in mesh with sun gear 40 and a ring gear 42 fixed to a clutch drum 44. A plurality of clutch plates 45 splined to clutch drum 44 are adapted to cooperate with clutch plates 48 splined to clutch hub 43. Clutch drum 44 is shaped to accommodate a clutch actuator piston 46 and a clutch release spring 47. Clutch drum 44 is also shaped to accommodate a one-way brake 49 for preventing reverse rotation of ring gear 42 when power is applied to sun gear 40 and to permit forward rotation thereof. Fluid under pressure may be admitted to a chamber 50 adjacent piston 46 to apply clutch 45—48 for direct drive through gear unit D. A hub member 51 carries disc brakes 52 adapted to cooperate with disc brakes 53 on the transmission housing to render one-way brake 49 effective. Fluid under pressure may be admitted to a chamber 54 adjacent a brake actuating piston 55 to engage brake discs 52—53. Brake discs 52—53 are engaged for all forward vehicle operation and are released to provide neutral or no drive. A two-way brake comprising a brake band 56 may be applied to clutch drum 44 to prevent either forward or reverse rotation of ring gear 42 when desired.

A reverse gear unit generally designated by the letter E includes a planet carrier 60 splined to output shaft 70 and supporting a plurality of planet gears 61 in mesh with a sun gear 62 and a ring gear 63. A drive plate 64 connects sun gear 62 to clutch drum 44 for rotation therewith. Ring gear 63 carries a double cone shaped member 65 adapted to grip a conical backing member 66 and a cone 67 on a piston 68 when fluid under pressure is admitted to a chamber 69 adjacent piston 68. Piston 68 brakes ring gear 63 against rotation during reverse drive. Ring gear 63 is permitted to rotate during forward drive.

OPERATION

The transmission is designed to provide a positive neutral condition of operation, four forward drive ratios, and reverse.

*Positive neutral*

In order to permit the operator of the vehicle to speed up the engine beyond normal idling speed without imparting drive to the vehicle, disc brake 52—53 may be released by exhausting fluid pressure from chamber 54. One-way brake 49 will therefore be unable to prevent reverse rotation of ring gear 42 of gear unit D. Fluid coupling C is empty of fluid. In the event that the engine is speeded up, for quick engine warm up or other purposes, no drive can be transmitted to planet carrier 43 and shaft 70 since ring gear 42 will rotate freely in a reverse direction to the direction of rotation of sun gear 40.

Forward drive—low gear

For forward drive in low gear fluid pressure is admitted to servo chamber 54 to apply disc brake 52—53. This renders one-way brake 49 effective to prevent reverse rotation of ring gear 42 of gear unit D. In low gear drive, clutch 18—19, clutch 45—48, and brake 65—66 are released. Fluid coupling C is empty of fluid.

Drive in low is accomplished through fluid drive of turbine 20 by impeller 15, the turbine 20 being effective to rotate ring gear 27 of gear unit B and impeller 37 of coupling C. Since the coupling C is empty of fluid it does not enter into the drive train. Sun gear 30 of gear unit B tends to rotate reversely to the direction of rotation of ring gear 27, but such action is prevented by one-way brake 36. Planet carrier 29, shaft 32 and sun gear 40 of gear unit D are therefore rotated in the reduction drive ratio of gear unit B. Reverse rotation of ring gear 42 is prevented by action of one-way brake 49, the reaction torque being transferred to the transmission housing through disc brake 52—53. Final drive of planet carrier 60 and shaft 70 is therefore through the reduction ratio of both gear units B and D.

Forward drive—second

To obtain second speed drive ratio, fluid coupling C is filled with fluid and clutch 18—19 is engaged to by-pass the fluid drive of coupling A. Ring gear 27 and impeller 37 are driven at engine speed without any hydraulic slip loss in coupling A. Turbine 38 drives sun gear 30 of gear unit B at substantially engine speed. Gear unit B is therefore locked up for direct drive of shaft 32 and sun gear 40. Drive to shaft 70 is at the reduction ratio of gear unit D.

Forward drive—third

For third speed drive ratio fluid coupling C is emptied of fluid and clutch 45—48 is engaged. Clutch 18 and 19 remains engaged. Drive is therefore through reduction in gear unit B and direct drive in gear unit D. The drive is entirely mechanical without any slip loss in the fluid coupling units.

Forward—direct

For forward direct drive, fluid coupling C is again filled with fluid to obtain direct drive through gear unit B. Clutches 18—19 and 45—48 remain engaged. Both gear units are therefore in direct drive.

Reverse

For reverse drive, clutch 18—19, clutch 45—48 and brake 52—53 are released. Coupling C is emptied of fluid. Brake 65—66 is applied to prevent rotation of ring gear 63 of reverse gear unit E. Drive of shaft 32 and sun gear 40 of gear unit D is in reduction ratio of gear unit B. Due to the loading of shaft 70 and planet carrier 43, ring gear 42 of gear unit D rotates reversely to the direction of rotation of sun gear 40, thereby driving sun gear 62 of gear unit E. Planet carrier 60 is rotated in the same direction of rotation as sun gear 62 but at the further reduction ratio of gear unit E. Thus, in reverse drive, shaft 70 is driven in the reduction drive ratio of the gear unit B and reverse unit E.

Downhill braking

In descending long or steep grades it is advantageous to take advantage of engine braking to prevent undue wear and over-heating of the vehicle wheel brakes. To accomplish this, two-way brake 34 and brake band 56 may selectively be applied to provide overrun braking in third gear and low gear drive ratios, respectively. When operating in third gear drive ratio application of two-way brake 34 will prevent rotation of sun gear 30 thereby placing gear unit B in reduction drive, and will also prevent rotation of turbine 38 of coupling C, thereby providing for hydrodynamic or churn braking in the coupling since coupling C is filled with working fluid. When operating in low gear application of brake band 56 to drum 44 will prevent rotation of ring gear 42 of gear unit D thereby placing gear unit D in reduction drive. A fluid pressure responsive servo (not shown) may be employed to apply band 56 to drum 44 as dictated by suitable controls.

Forced downshift

When operating in direct drive, a quick change of ratio from direct to third speed drive ratio may be had by emptying fluid coupling C of working fluid. This may be accomplished by suitable valving (not shown) effective to accomplish this result when the vehicle accelerator pedal (not shown) is pressed beyond its wide open throttle position.

It will be understood from the foregoing description that the transmission is designed for minimum space requirements and for maximum efficiency. With the transmission conditioned for forward drive and the engine idling there will be sufficient slip in coupling A to permit the engine to idle at normal idle speeds without driving the vehicle and without creep. In low or first gear, drive is hydraulically through coupling A with considerable slip to permit rapid engine speed up and consequent rapid vehicle acceleration. Upon a shift to second gear ratio, and in all other forward speeds, clutch 18—19 is engaged to provide for maximum efficiency in transmitting torque from the engine shaft 10 to sleeve shaft 25. In low gear, engine vibration is absorbed by dampener 14 and coupling unit A. In second gear such vibrations are dampened by dampener 14 and coupling C. In third gear the engine vibrations are dampened by dampener 14, and in direct drive they are dampened by dampener 14 and coupling C. The transmission is smooth in operation, requires minimum space in assembled relationship in a vehicle and is highly efficient.

Fluid under pressure may be admitted to the various brakes, fluid coupling C and the clutches by means of suitable passages, and under control of suitable valving, not shown. However, since the use of dump and fill couplings and brakes and clutches per se is well known in the art it is not deemed necessary to shown the passages and valving herein.

In Figure 2 there is shown an alternate arrangement of a transmission similar to that of Figure 1 and adapted for use with the gearing units of Figures 1 and 1A wherein certain structural changes are incorporated whereby the impellers of both fluid coupling devices are directly driven at engine speed at all times.

Referring to Figure 2 there is shown an engine driven power input shaft 110 connected by a flywheel 111 to a torus cover 112 and a clutch hub 113. Clutch hub 113 is secured to an impeller 115 of a fluid coupling unit generally designated at F, and carries clutch plates 116 splined thereto. Torus cover 112 is splined to a drive sleeve 114 fixed to an impeller 117 of a second fluid coupling unit generally designated at G. Fluid coupling F includes a turbine 118 having a hub 119 splined to a drive sleeve 120 having a drive member 121 fixed thereto. A clutch drum 122 fixed to member 121 carries clutch plates 123 splined thereto and a clutch backing member 124. Sleeve 120 and member 121 are shaped to form a chamber 125 having a clutch actuating piston 126 therein. Fluid under pressure may be admitted to chamber 125 to actuate clutch 116—123 by way of passage 127, port 128, passage 129 and ports 130—131. Suitable valving, not shown, may be employed to control the admission to and exhaust of fluid under pressure from servo chamber 125. Clutch drum 122 is connected to drive a ring gear 136 of a planetary gearing unit H by means of a vibration dampener 132. Fluid coupling unit G includes a turbine 133 having its hub 134 fixed to a shaft 135, the shaft 135 being splined to a sun gear 137 of gear unit H. A planet carrier 139, splined to a shaft 140 supports a plurality of planet gears 138 in mesh with sun gear 137 and ring gear 136. Shaft 140 carries a sun gear 141 splined thereto for rotation therewith, the sun gear 141 corresponding to sun gear 40 of Figure 1A. It will be understood that sun gear 141 is to be connected into a gear unit similar to gear unit D of Figure 1A and that a reverse unit similar to gear unit E is to be employed in the same manner as shown in Figure 1A. Likewise, shaft 135 is to be provided with a one-way brake similar to brake 36 of Figure 1A and a two way brake similar to brake 34 of Figure 1A. Also a forward brake unit similar to brake 52—53 and a one-way brake similar to brake 49 of Figure 1A are to be incorporated into the planetary gear unit driven by sun gear 141. Thus, the structural arrangement of Figure 2 is employed with the same gearing, clutch and brake arrangements shown in Figure 1A. In view of this fact, such arrangements are not repeated in Figure 2.

In the arrangement in Figure 2, the vibration dampener 132 is connected between the turbine 118 and ring gear 136 rather than between the impeller and engine shaft as is true in Figure 1. In both cases, however, the vibration dampener is effective whether the drive through coupling units A and F is through the hydraulic system as a mechanical drive. It will be understood that in either modification, the mode of operation heretofore described will be employed. Fluid coupling device F, like fluid coupling A is incapable of transmitting full engine torque. Accordingly the clutch 116—123 will be engaged in all forward drive ratios other than low. It will be readily understood that with the Figure 2 embodiment there will be less hydraulic slip loss in the fluid coupling unit G since its impeller is driven directly by engine shaft 110 rather than by the turbine of the first coupling unit as is the case in the Figure 1A version.

What is claimed is:

1. In a transmission, a power input shaft, a power output shaft, means for transmitting torque from said input shaft to said output shaft including first and second fluid coupling devices and first and second planetary gearing units, each of said fluid coupling devices comprising an impeller and a turbine, each of said gearing units comprising a planet carrier supporting a plurality of planet gears in mesh with a sun gear and a ring gear, respectively, a selectively operable clutch for locking the turbine of said first fluid coupling device to the impeller of said device, a drive connection between said power input shaft and the impeller of said first coupling device, a drive connection between the turbine of said first coupling device and the ring gear of the first gear unit and the impeller of said second coupling device, said drive connection comprising a hollow sleeve shaft driven by said impeller of said first coupling device and having a drive flange connected to said first gear unit ring gear, a drive connection between said second fluid coupling unit impeller and said first gear unit ring gear comprising a second hollow sleeve shaft having a flange thereon connected to said ring gear, a drive connection between the sun gear of said first gear unit and the turbine of said second fluid coupling device, said drive connection comprising a third hollow sleeve shaft extending through said second hollow sleeve shaft, one-way brake means for preventing rotation of said first gear unit sun gear in one direction and for permitting rotation of said sun gear in the opposite direction, said second fluid coupling unit being adapted to be alternately filled with working fluid and emptied of the same, a drive connection between said first gear unit planet carrier and said second gear unit sun gear, said last-mentioned drive connection comprising a shaft extending through said third hollow sleeve shaft and piloted for rotation in said first hollow sleeve shaft and said output shaft, one-way brake means for preventing rotation of said second gear unit ring gear in one direction and for permitting rotation of said ring gear in the opposite direction, said second gear unit planet carrier being connected to said output shaft, and a selectively operable clutch for locking said second gear unit ring gear and sun gear to each other.

2. In a four speed forward step ratio transmission, a power input shaft, a power output shaft, means for transmitting torque from said input shaft to said output shaft including first and second fluid coupling devices and first and second planetary gearing units, each of said fluid coupling devices comprising an impeller and a turbine, said first fluid coupling device being incapable in its hydraulic operation of transmitting full engine torque from its impeller to its turbine, a selectively operable clutch for locking the turbine of the first fluid coupling device to its impeller, said clutch being released in first speed drive ratio and applied in second, third and fourth forward drive ratios, a drive connection between said power input shaft and the impeller of said first fluid coupling device, means connecting the turbine of said first coupling device to a ring gear of said first gear unit and to the impeller of said second fluid coupling device, said connecting means comprising a first hollow sleeve shaft extending between said first coupling unit turbine and said ring gear and a second hollow sleeve shaft extending between said second coupling unit impeller and said ring gear, said second fluid coupling device being empty of working fluid in first and third speed drive ratios and filled with working fluid in second and fourth speed drive ratios, means connecting a sun gear of said first gear unit to the turbine of said second fluid coupling device, said connecting means comprising a third hollow sleeve shaft extending through said second hollow sleeve shaft, one-way brake means for preventing rotation of said last-mentioned gear in one direction and for permitting rotation thereof in the opposite direction, a drive connection between a planet carrier of said first gearing unit and a sun gear of said second gearing unit, said drive connection comprising a shaft extending through said third sleeve shaft and piloted for rotation in said first hollow sleeve shaft and said output shaft, one-way brake means for preventing rotation of a second ring gear of said second gearing unit in one direction and for permitting rotation thereof in the opposite direction, a planet carrier of said second gearing unit connected to said output shaft, and a selectively operable clutch for locking the aforesaid gears of said second gearing unit to each other, said last-mentioned clutch being released in first and second speed drive ratio and engaged in third and fourth speed drive ratios.

3. In a transmission, a power input shaft, a power output shaft, means for transmitting torque from said power input shaft to said power output shaft including first and second fluid coupling devices and first and second planetary gearing units, each of said fluid coupling devices comprising an impeller and a turbine, said first fluid coupling device being incapable in its hydraulic operation of transmitting full engine torque from its impeller to its turbine, a selectively operable clutch for locking the turbine of said first fluid coupling device to its turbine, said clutch being released in first speed drive ratio and applied in all other forward drive ratios, a drive connection between said power input shaft and the impeller of said first fluid coupling device, said gearing units each including a planet carrier supporting a plurality of planet gears in mesh with a ring gear and a sun gear, respectively, a drive connection between the turbine of said first coupling device, said first gear unit ring gear and the impeller of said second fluid coupling device; said drive connection comprising a first hollow shaft extending between said first coupling unit turbine and said first gear unit ring gear and a second hollow shaft extending between said second coupling unit impeller and said ring gear, said shafts connecting said ring gear to said first coupling unit turbine and said second coupling unit turbine for rotation as a unit, said second fluid coupling device being empty of working fluid in first and third speed drive ratios and filled with working fluid in second and fourth speed drive ratios, a drive connection between the sun gear of said first gear unit and the turbine of said second fluid coupling device, said drive connection comprising a third hollow shaft extending through said second hollow shaft, one-way brake means for preventing rotation of said first gear unit sun gear in one direction and for permitting rotation thereof in the opposite direction, a drive connection between said first gear unit planet carrier and said second gear unit sun gear, said drive connection comprising a shaft extending through said third hollow shaft and piloted for rotation in said first hollow shaft and said output shaft, one-way brake means for preventing rotation of said second gear unit ring gear in one direction and for permitting rotation thereof in the opposite direction, said second gear unit planet carrier being connected to said output shaft, and a selectively operable clutch for locking said last-mentioned ring gear and sun gear to each other, said last-mentioned clutch being released in first and second speed drive ratio and engaged in third and fourth speed drive ratio.

4. A step-ratio transmission adapted to provide four forward drive ratios comprising a transmission case enclosing first and second step ratio gear units and first and second fluid coupling units in said case, said first fluid coupling unit comprising an engine driven impeller and a turbine disposed adjacent one end of said case, said second fluid coupling unit being disposed in said case intermediate said first gear unit and said second gear unit and adapted to be alternately filled with and emptied of working fluid to control the drive ratio of said first gear unit, an engageable and releasable disc clutch effective when engaged to lock said first fluid coupling turbine to said first fluid coupling impeller, said first gear unit comprising a planet carrier supporting a plurality of planet pinions in mesh with a ring gear and a sun gear, a drive connection for driving said ring gear including a hollow sleeve shaft directly connecting said ring gear to said first fluid coupling turbine, said second fluid coupling unit comprising an impeller and a turbine, a drive connection between said second coupling unit impeller and said ring gear including a second sleeve shaft directly connecting said second coupling unit impeller to said ring gear for rotation therewith, said first gear unit being positioned in said case intermediate said first and second fluid coupling unit, said second gear unit comprising a planet carrier supporting a plurality of planet gears in mesh with a ring gear and a sun gear and being disposed in said case rearwardly of said second-mentioned fluid coupling unit, a third sleeve shaft for connecting the sun gear of said first gear unit to the turbine of said second fluid coupling unit for rotation therewith, a one-way brake for preventing reverse rotation of said third sleeve shaft and said first gear unit sun gear and for permitting forward rotation of the same, means for drivingly connecting the sun gear of said second gear unit to the planet carrier of said first gear unit comprising a fourth shaft extending through said third sleeve shaft, engageable and releasable brake means for preventing rotation of said second gear unit ring gear, and engageable and releasable brake means for locking said second gear unit ring gear to said second gear unit sun gear.

References Cited in the file of this patent

UNITED STATES PATENTS

| | | |
|---|---|---|
| 2,045,615 | Rosle et al. | June 30, 1936 |
| 2,120,733 | Cotal | June 14, 1938 |
| 2,130,895 | Ness | Sept. 20, 1938 |
| 2,351,213 | James | June 13, 1944 |
| 2,368,873 | Pollard | Feb. 6, 1945 |
| 2,578,450 | Pollard | Dec. 11, 1951 |
| 2,682,786 | Flinn | July 6, 1954 |
| 2,749,767 | Ebsworth | June 12, 1956 |
| 2,749,777 | Simpson | June 12, 1956 |
| 2,771,795 | Orr | Nov. 27, 1956 |
| 2,851,906 | De Lorean | Sept. 16, 1958 |